March 15, 1966 J. J. STONE ET AL 3,240,956

CLAMPING CIRCUIT

Filed Dec. 10, 1962

JOSEPH J. STONE
THOMAS J. PAVLIK
INVENTORS.

BY Samuel Lindenberg

ATTORNEY

United States Patent Office 3,240,956

Patented Mar. 15, 1966

3,240,956
CLAMPING CIRCUIT

Joseph J. Stone, Glenview, and Thomas J. Pavlik, Elk Grove Village, Ill., assignors to A. B. Dick Company, Chicago, Ill., a corporation of Illinois Filed Dec. 10, 1962, Ser. No. 243,295
2 Claims. (Cl. 307—88.5)

This invention relates to clamping circuits and more particularly to improvements therein.

An object of this invention is the provision of a clamping circuit arrangement which can operate at video frequencies.

Another object of the present invention is the provision of a clamping circuit which is not saturated by large signals.

Yet another object of the present invention is the provision of a novel, useful and simple clamping circuit.

These and other objects of this invention may be achieved by provision of a clamping circuit consisting essentially of a transistor having a capacitor connected between its emitter and collector, with its emitter and collector being connected in the signal path, and having a bias applied to its base and emitter having values such that in the quiescent state these will not conduct. Signals to be clamped are applied to the collector. If the polarity of these signals is such as not to render the transistor conductive then the diode formed by the emitter and base of the transistor clamps one side of the signal at the value of the base. Should the signal applied to the collector have a polarity and amplitude such as to tend to make the transistor conductive, then the conductive transistor effectively serves to discharge the capacitor and to thereby enable the circuit to recover sufficiently rapidly to be able to permit clamping action substantially instantaneously when required.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
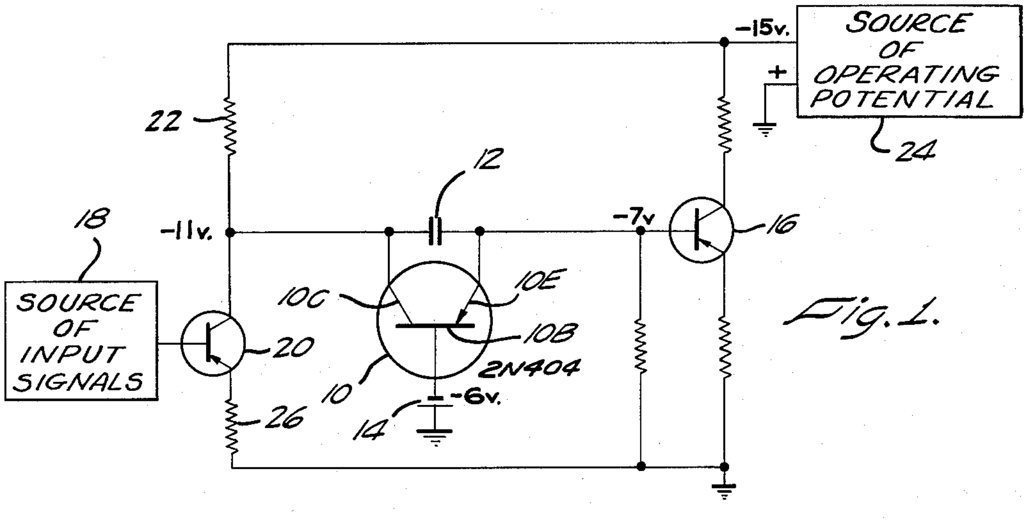
FIGURE 1 is a circuit diagram of an embodiment of the invention for negative going signals.

Referring now to FIGURE 1 which is a circuit diagram of an embodiment of this invention, the clamping circuit essentially comprises a transistor 10 having an emitter 10E, a collector 10C, and a base 10B. A capacitor 12, is connected between the collector and emitter of the transistor 10. Transistor shown is of the PNP type. Another transistor 16, of the PNP type, has its base connected to the emitter of transistor 10, and is connected through a resistor to ground. The collector of transistor 16 is connected through a resistor to a source of operating potential and the emitter is connected through a resistor to ground.

A negative bias is applied from a source 14 to the base of the transistor. This causes some current to flow from the operating potential source through resistor 22, through the collector-emitter path of the transistor 10, and through the resistor connected between the emitter of transisor 10 to ground. As a result of this current flow, a potential on the order of —7 volts is established at the emitter 10E. Thus, the quiescent state of this transistor is one in which it trickles just enough current to maintain this —7 volt bias value, so that the transistor 10 may be said to be substantially cut off. In an embodiment of the invention which was built, by way of illustration, and not by way of limitation, a minus 6 volt bias was connected to the base 10B. The transistor 16, serves to amplify any signals which are applied to its base, through the clamping circuit. Signals to be clamped are received from a source of input signals 18, and are applied to the base of the transistor 20. The transistor 20 is of the PNP type and has a load resistor 22 connecting its collector to a source of operating potential 24. Another resistor 26, connects the emitter of transistor 20 to ground. It will be noted that, the collectcr of the transistor 10 is connected to the collector of the transistor 20. Therefore, the signal path between the collector of transistor 20 and the base of transistor 16 has the collector and emitter of the transistor 10 connected thereto.

Upon the application of a signal by transistor 20 to the collector of transistor 10 whose most positive portion is more negative than the base, because of diode action by the transistor 10, the signal is transmitted with the peaks clamped to the base voltage. When a signal is such that the emitter tends to go positive with respect to the base, the capacitor charges up with a polarity to operate as a power source for the transistor. The transistor then becomes conductive and current flows through the transistor discharging the capacitor and returning the emitter to its negative potential.

Accordingly, by way of illustration with input signals ranging from minus 7 to minus 13 volts to transistor 10, output signals would be received which range from minus 6 to minus 11 volts. The value of the base bias is minus 6 volts and this set the upper limit of the clamping voltage. The application of a signal having an amplitude of minus 13 volts did not block or saturate the clamping circuit, since the transistor quickly discharged the capacitor to enable the clamping circuit to effectively clamp the upper value of the input signal, almost instantaneously.

Figure 2:
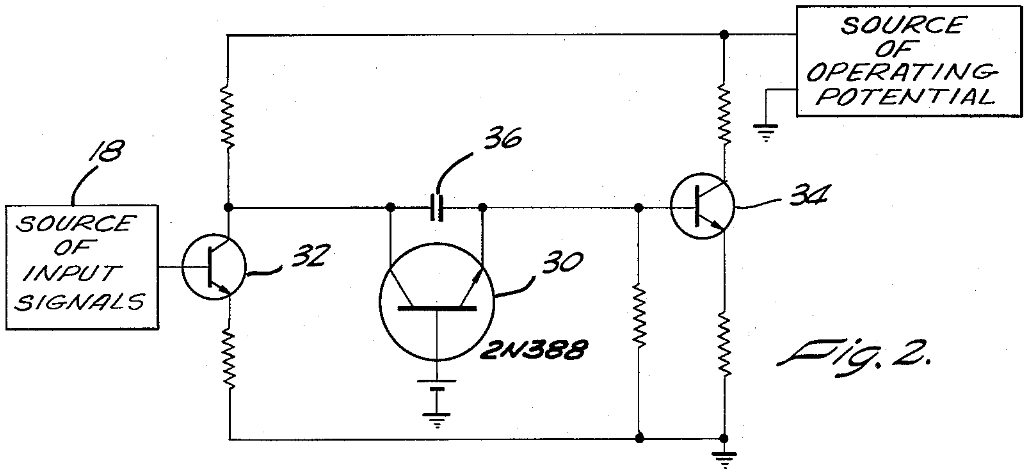
FIGURE 2 is a circuit diagram of an embodiment of the invention for positive going signals.

FIGURE 2 shows a circuit arrangement for clamping the negative going portion of a signal. The configuration of the circuit is identical to that shown in FIGURE 1 except that instead of a PNP transistor being employed, a NPN transistor 30 is employed, having a positive bias applied to its base. The operation of the arrangement is essentially the same. The quiescent bias applied to the emitter is sufficient to maintain the transistor substantially non-conductive. Signals which are applied by the input transistor 32, to the collector of the transistor 30, which have their most negative portions more positive than the base bias, will be clamped to the base bias voltage by reason of the diode action of the emitter base path of the transistor 30. When the signal is such that the emitter tends to go negative with respect to the base, then the capacitor 36, which is connected between the collector and emitter, of the transistor 30, operates as a power source for the transistor and is quickly discharged by the transistor so that the clamping circuit can immediately return to the operative state.

Figure 3:
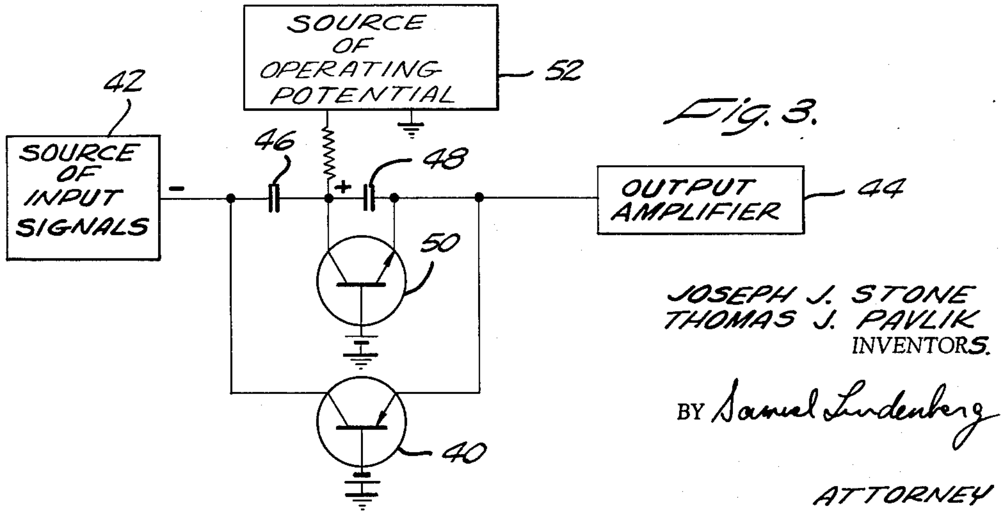
FIGURE 3 shows an arrangement of the invention to handle both positive and negative going signals.

In order to provide a clamping circuit which clamps both positive and negative sides of a signal, both embodiments of the invention shown in FIGURE 1 and FIGURE 2 may be combined in an arrangement as shown in FIGURE 3. Here, the negative clamping portion of the circuit includes the PNP transistor 40, having its collector connected to the source of input signals 42, and emitter connected to the output amplifier 44. A first capacitor 46, is connected in series with a second capacitor 48. Series connected capacitors 46 and 48 are connected between the collector and emitter of transistor 40 and together are analogous to capacitor 12 in FIGURE 1. The clamp for a negative going signal is provided by the transistor 50. This transistor has a collector connected to a source of operating potential 52. The collector is also connected to the junction between capacitors 46 and 48. The emitter of transistor 50 is connected to the output amplifier. Thus, the transistor 50 and capacitor 49, are analogous to the transistor 30, and the capacitor 36.

Signals from the source of output signals 42, have their most positive peaks clamped to the source of bias potential for the transistor 40. Most negative peaks are clamped to the bias potential applied to the base of transistor 50. Effectively, these transistors and their associated capacitors operate in the same manner as has been described. Signals within the clamping range are transmitted unaffected. Otherwise, the upper and lower levels of the clamp signals are set by the bias applied to the bases of the transistors 40 and 50. The circuit is not saturated by reason of the occurrence of large signals, but is substantially instantaneously available for clamping action.

There has accordingly been described and shown herein a novel, useful and unique clamping circuit for use at high frequencies where instantaneous operation is always provided despite the presence of "circuit swamping" signals.

We claim:

1. A clamping circuit having an input terminal and an output terminal, a transistor having emitter, base and collector, means for connecting said collector to said input terminal, means for connecting said emitter to said output terminal, a capacitor connected between said emitter and collector, a source of operating potential having a first and a second output terminal, a first resistor directly connecting said first terminal to said collector, a second resistor directly connecting said second terminal to said emitter, and means for applying a biasing potential to said transistor base to maintain said transistor substantially at cut off during the quiescent state of said clamping circuit.

2. A clamping circuit for signals comprising an input terminal to which said signals are applied, an output terminal from which clamped signals are derived, a first capacitor, a second capacitor connected in series with said first capacitor, means connecting said first and second capacitors between said input and output terminals, a first transistor of one impurity type having emitter, collector and base electrodes, means connecting said first transistor collector to said signal input terminal, means connecting said first transistor emitter to said signal output terminal, a first bias source connected to said first transistor base, a second transistor of an impurity type opposite to that of said first transistor having base, emitter and collector electrodes, means connecting said second transistor collector between said first and second capacitors, means connecting said second transistor emitter to said signal output terminal, and a second bias source connected to the base of said second transistor.

References Cited by the Examiner

UNITED STATES PATENTS

| | | | |
|---|---|---|---|
| 2,797,327 | 6/1957 | Kidd | 307—88.5 |
| 2,947,950 | 8/1960 | Pinckaers | 307—88.5 |
| 3,065,362 | 11/1962 | Benson | 307—88.5 |
| 3,105,160 | 9/1963 | Adler | 307—88.5 |
| 3,109,107 | 10/1963 | Lee | 307—88.5 |

JOHN W. HUCKERT, *Primary Examiner.*

DAVID J. GALVIN, *Examiner.*